US008810487B2

(12) United States Patent
Lee

(10) Patent No.: US 8,810,487 B2
(45) Date of Patent: Aug. 19, 2014

(54) FLAT PANEL DISPLAY AND METHOD FOR DRIVING THE FLAT PANEL DISPLAY

(75) Inventor: Hyunjae Lee, Kyungbuk (KR)

(73) Assignee: LG Display Co., Ltd., Seoul (KR)

( * ) Notice: Subject to any disclaimer, the term of this patent is extended or adjusted under 35 U.S.C. 154(b) by 1007 days.

(21) Appl. No.: 12/883,342

(22) Filed: Sep. 16, 2010

(65) Prior Publication Data

US 2011/0063269 A1 Mar. 17, 2011

(30) Foreign Application Priority Data

Sep. 17, 2009 (KR) ........................ 10-2009-0088243

(51) Int. Cl.

| | |
|---|---|
| ***G09G 3/30*** | (2006.01) |
| ***G06F 3/038*** | (2013.01) |
| ***G09G 5/00*** | (2006.01) |
| ***G09G 3/32*** | (2006.01) |
| ***G09G 3/36*** | (2006.01) |
| *G09G 3/00* | (2006.01) |
| *G09G 3/34* | (2006.01) |
| *G09G 5/06* | (2006.01) |

(52) U.S. Cl.

CPC ...... *G09G 3/3225* (2013.01); *G09G 2320/0666* (2013.01); *G09G 2360/16* (2013.01); *G09G 3/006* (2013.01); *G09G 3/3648* (2013.01); *G09G 2320/0626* (2013.01); *G09G 2320/0673* (2013.01); *G09G 2310/0245* (2013.01); *G09G 2360/14* (2013.01); *G09G 2360/145* (2013.01); *G09G 3/3406* (2013.01); *G09G 2320/0285* (2013.01); *G09G 5/06* (2013.01)

USPC .............................................. 345/77; 345/207

(58) Field of Classification Search

CPC ................. G09G 2320/0626; G09G 2360/145

USPC ............................................................ 345/77

See application file for complete search history.

(56) References Cited

U.S. PATENT DOCUMENTS

| | | | | |
|---|---|---|---|---|
| 2002/0037754 | A1 * | 3/2002 | Hama et al. | 455/566 |
| 2006/0181552 | A1 * | 8/2006 | Hopple | 345/690 |

FOREIGN PATENT DOCUMENTS

| | | | |
|---|---|---|---|
| JP | 7-333581 | A | 12/1995 |

OTHER PUBLICATIONS

Korean Office Action (Application No. 10-2009-0088243), dated Jan. 4, 2013.

* cited by examiner

*Primary Examiner* — Dwayne Bost
*Assistant Examiner* — Christopher Kohlman
(74) *Attorney, Agent, or Firm* — Morgan, Lewis & Bockius LLP

(57) ABSTRACT

A flat panel display including a display unit, the display unit displaying a first image, an input unit, the input unit being positioned adjacent to the display unit when the display unit is folded toward the input unit, at least one sensor, the sensor detecting luminance information of a second image displayed on the display unit when the display unit is folded toward the input unit, and an optical correction unit, the optical correction unit receiving the luminance information from the sensor and correcting a luminance of the display unit using the luminance information.

20 Claims, 7 Drawing Sheets

FLAT PANEL DISPLAY AND METHOD FOR DRIVING THE FLAT PANEL DISPLAY

This application claims the benefit of Korean Patent Application No. 10-2009-0088243 filed on Sep. 17, 2009, which is hereby incorporated by reference.

BACKGROUND OF THE INVENTION

1. Field of the Invention

The present invention relates to a flat panel display, and more particularly to a flat panel display that corrects luminance, and a method of driving such a flat panel display.

2. Discussion of the Related Art

There are various kinds of flat panel displays at present. Examples of flat panel displays include an organic light emitting diode (OLED) display and a liquid crystal display (LCD). These flat panel displays are used in various applications. Exemplary uses of flat panel displays include a monitor, a television, a mobile device, a notebook, a netbook, etc.

An optical correction process has to be performed on the flat panel displays before the flat panel displays are put on the market so that the flat panel displays provide the optimum display quality to consumers. For example, in the liquid crystal display, a luminance of a backlight unit is controlled by a target specification using an optical measuring instrument. In another example, in the OLED display, a luminance and a color coordinate of the OLED display are controlled at a target value by independently controlling red, green, and blue subpixels.

Increasing usage of the flat panel display increases, however, causes a degradation phenomenon, in which an initial luminance of the flat panel display is reduced. When the degradation phenomenon occurs in the flat panel displays, the luminance reduction and changes in the color coordinate occur. Therefore, as time usage of the flat panel displays increases, it is difficult to provide the optimum display quality to consumers.

SUMMARY OF THE INVENTION

Accordingly, the present invention is directed to a flat panel display and method for driving the flat panel display that substantially obviates one or more problems due to limitations and disadvantages of the related art.

An object of the present invention is to provide an improved flat panel display.

Another object of the present invention is to provide a flat panel display that corrects the luminance of the displaying unit.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the flat panel display and method for driving the flat panel display includes a flat panel display including a display unit, the display unit displaying a first image, an input unit, the input unit being positioned adjacent to the display unit when the display unit is folded toward the input unit, at least one sensor, the sensor detecting luminance information of a second image displayed on the display unit when the display unit is folded toward the input unit, and an optical correction unit, the optical correction unit receiving the luminance information from the sensor and correcting a luminance of the display unit using the luminance information.

In another aspect, the flat panel display and method for driving the flat panel display includes a method for operating a display unit, including the steps of displaying a first image when the display unit is not folded toward an input unit, confirming that the display unit is folded toward the input unit, displaying a second image on the display unit when the display unit is folded toward the input unit, detecting luminance information of the second image, transferring the luminance information of the second image to an optical correction unit, comparing the luminance information with reference luminance information, and performing a correction operation if the luminance information is not within a predetermined range of the reference luminance information.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE EXEMPLARY EMBODIMENTS

Reference will now be made in detail to the embodiments of the present invention, examples of which are illustrated in the accompanying drawings.

Figure 1:
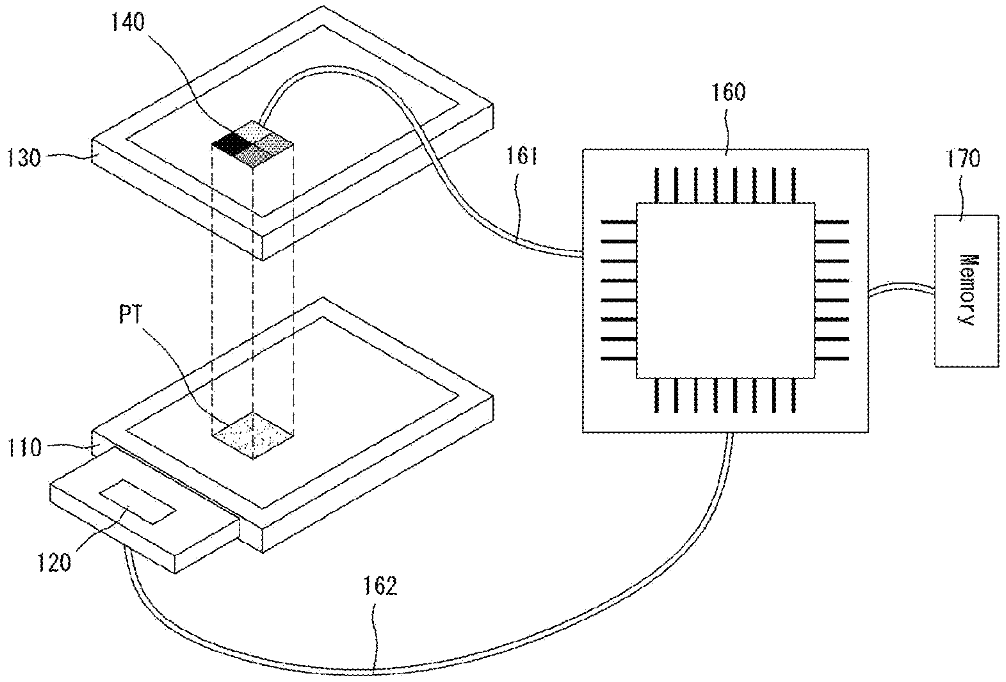
FIG. 1 illustrates an exemplary configuration of a flat panel display according to the present invention.
Figure 2:
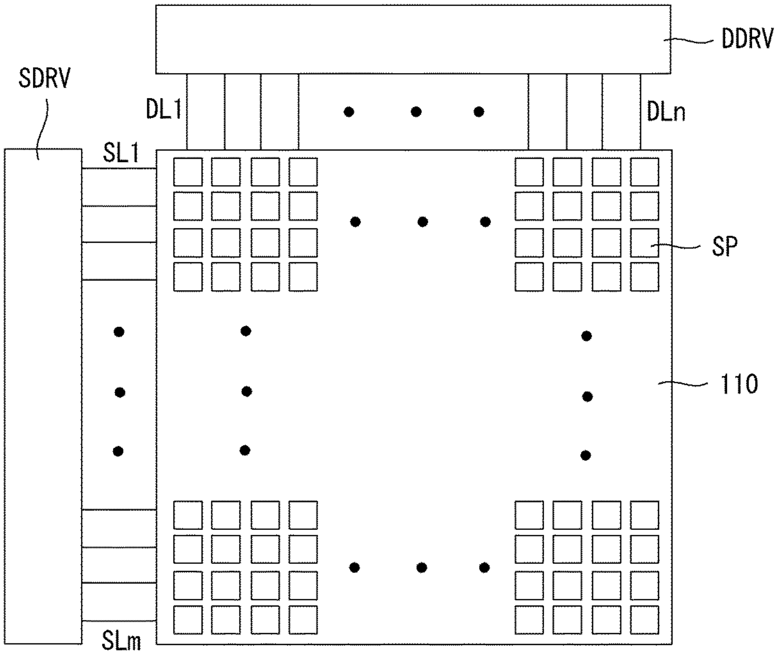
FIG. 2 is an exemplary block diagram of a display unit of FIG. 1.

FIG. 1 illustrates an exemplary configuration of a flat panel display according to the present invention. FIG. 2 is an exemplary block diagram of a display unit of a display unit of FIG. 1.

As shown in FIG. 1, a flat panel display includes a display unit 110, a driver 120, an input unit 130, a sensor 140, an optical correction unit 160, and a memory 170. The optical correction unit 160 may be connected to the sensor 140 through a sensor line 161 and may be connected to the driver

120 through a signal line 162. The display unit 110 may serve as an organic light emitting diode (OLED) display panel or a liquid crystal display (LCD) panel.

The optical correction unit 160 receives luminance information of the image displayed on the display unit 110 from the sensor 140 and corrects the luminance of the display unit 110 using the luminance information. The optical correction unit 160 compares the luminance information detected by the sensor 140 with a reference luminance set inside the optical correction unit 160. When there is a difference between the reference luminance and the luminance information, the optical correction unit 160 produces a correction value corresponding to the difference and the correction value is stored in the memory 170. Accordingly, every time the flat panel display is turned on, the display unit 110 may display a corrected image to which the correction value stored in the memory 170 is applied. The optical correction unit 160 may perform a correction operation to produce the correction value until the difference between the reference luminance and the luminance information falls within a predetermined error range.

The memory 170 may be included in the optical correction unit 160 or may be configured as a memory connected to the optical correction unit 160. However, the memory 170 is not limited thereto. For example, the memory 170 may be configured as a memory included in the driver 120 or a memory included in a timing driver, for example, controlling the driver 120.

As shown in FIG. 2, the display unit 110 includes a plurality of subpixels SP arranged at crossings of the data lines DL1 to DLn and the scan lines SL1 to SLm, the data lines DL1 to DLn and the scan lines SL1 to SLm intersecting each other in a matrix form. The display unit 110 may include a data driver DDRV supplying a data signal to the data lines DL1 to DLn and a scan driver SDRV supplying a scan signal to the scan lines SL1 to SLm. Because each of the data driver DDRV and the scan driver SDRV is integrated into one chip, each of the data driver DDRV and the scan driver SDRV may have a mount structure in the same manner as the driver 120 shown in FIG. 1. Other structures may be used for the data driver DDRV and the scan driver SDRV. For example, the scan driver SDRV may be separated from the driver 120 and may have a gate-in-panel (GIP) structure formed in the display unit 110.

Each of the subpixels SP of the display unit 110 serving as the OLED display panel includes at least one switching transistor (not shown), a driving transistor (not shown), a capacitor (not shown), and an organic light emitting diode (not shown). The switching transistor performs a switching operation in response to the scan signal supplied through the scan lines. The capacitor stores the data signal supplied through the data lines as a data voltage. The driving transistor enables the organic light emitting diode to be driven depending on the data voltage stored in the capacitor.

Each of the subpixels SP of the display unit 110 serving as the LCD panel includes at least one switching transistor, a capacitor, and a liquid crystal layer. The switching transistor performs a switching operation in response to the scan signal supplied through the scan lines. The capacitor stores the data signal supplied through the data lines as a data voltage. The liquid crystal layer controls light provided by a backlight unit depending on the data voltage.

Figure 3:
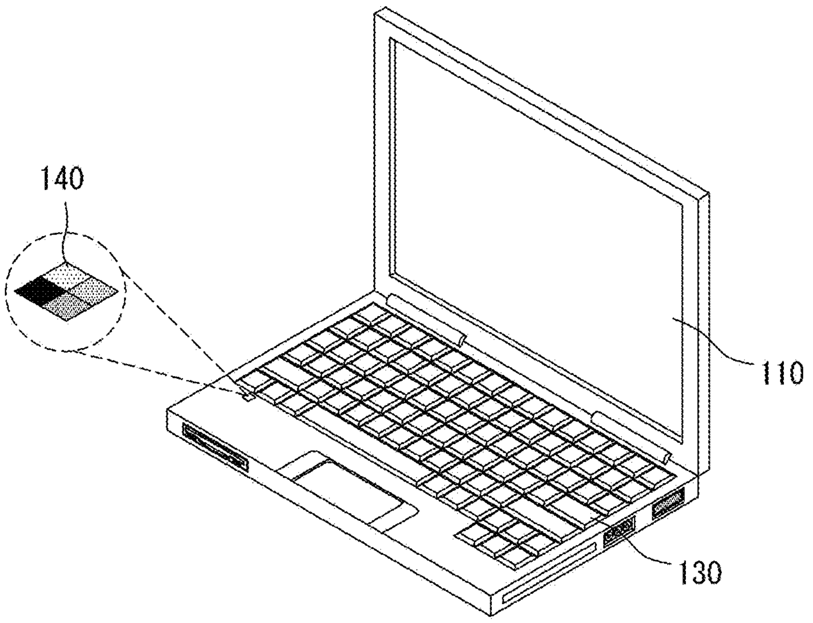
FIG. 3 illustrates an exemplary application of a flat panel display according to the present invention.
Figure 4:
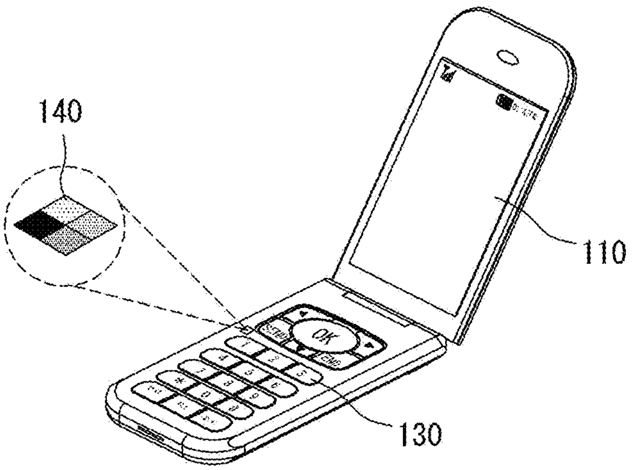
FIG. 4 illustrates another exemplary application of a flat panel display according to the present invention.

FIG. 3 illustrates an exemplary application of a flat panel display according to the present invention. FIG. 4 illustrates another exemplary application of a flat panel display according to the present invention.

The flat panel display may have a structure in which the display unit 110 is positioned opposite the input unit 130 and the sensor 140 is formed in the input unit 130. Accordingly, the flat panel display may be manufactured for various uses. The flat panel display may be included in a variety of applications such as a notebook, a netbook, etc. As shown in FIG. 3, the sensor 140 is formed in the input unit 130. The flat panel display may also be included in a mobile phone. As shown in FIG. 4, the sensor 140 is formed in the input unit 130.

Figure 5:
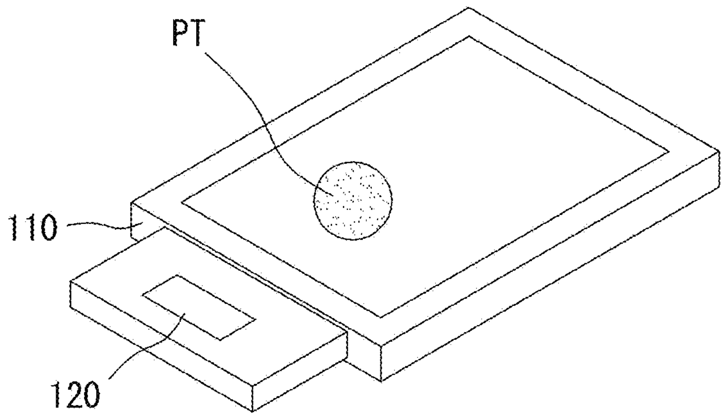
FIG. 5 illustrates an exemplary image displayed on a display unit.
Figure 6:
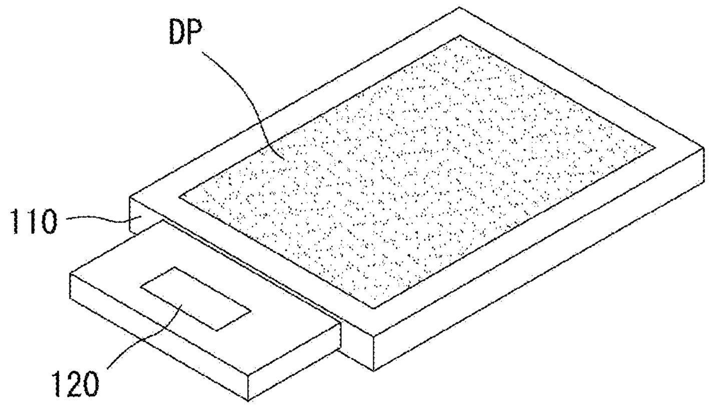
FIG. 6 illustrates another exemplary image displayed on a display unit.

FIG. 5 illustrates an exemplary image displayed on a display unit. FIG. 6 illustrates another exemplary image displayed on a display unit.

The display unit 110 receives various driving signals from the driver 120 and displays an image corresponding to the various driving signals. The driver 120 may include a data driver DDRV supplying data signals to the display unit 110 and a scan driver SDRV supplying a scan signal to the display unit 110. When the display unit 110 is folded toward the input unit 130, the display unit 110 displays an image showing at least one of a white, red, green, and blue test pattern so that the sensor 140 can detect luminance information of the image. As shown in FIGS. 1 and 5, when the display unit 110 is folded toward the input unit 130, an image may be displayed on the display unit 110, such as a rectangular or circular pattern PT, in a portion of the display unit 110 corresponding to a location of the sensor 140. As shown in FIGS. 1 and 6, when the display unit 110 is folded toward the input unit 130, an image may be displayed on the display unit 110, such as an image DP, and may be displayed entirely on a display screen of the display unit 110. In other words, when the display unit 110 is folded toward the input unit 130, the image displayed on the display unit 110 is not limited to the shape or the size of the pattern.

The input unit 130 may be a keyboard used to electromagnetically write or input a character, a number, a special character, etc. by a user. The input unit 130 may be positioned opposite the display unit 110 when the display unit 110 is folded.

The sensor 140 detects the luminance information of the image (for example, the pattern PT) displayed on the display unit 110 when the display unit 110 is folded. The sensor 140 may use a short wavelength sensor, an RGB color sensor, or a sensor capable of reading an optical value. The sensor 140 may be formed in the built-in form on the input unit 130 as shown in FIGS. 3 and 4. If the sensor 140 is formed in the built-in form on the input unit 130, the sensor 140 may be protected by a protective cover, etc. Other mount forms may be used for the sensor 140. For example, the sensor 140 may be mounted on a printed circuit board and may be inserted into a connector in a detachable form for easy replacement. The sensor 140 may be positioned in an area of the input unit 130 corresponding to the outside of the display unit 110 or in an area of the input unit 130 corresponding to the middle of the display unit 110. In other words, the sensor 140 may be properly positioned depending on types of flat panel displays.

Figure 7:
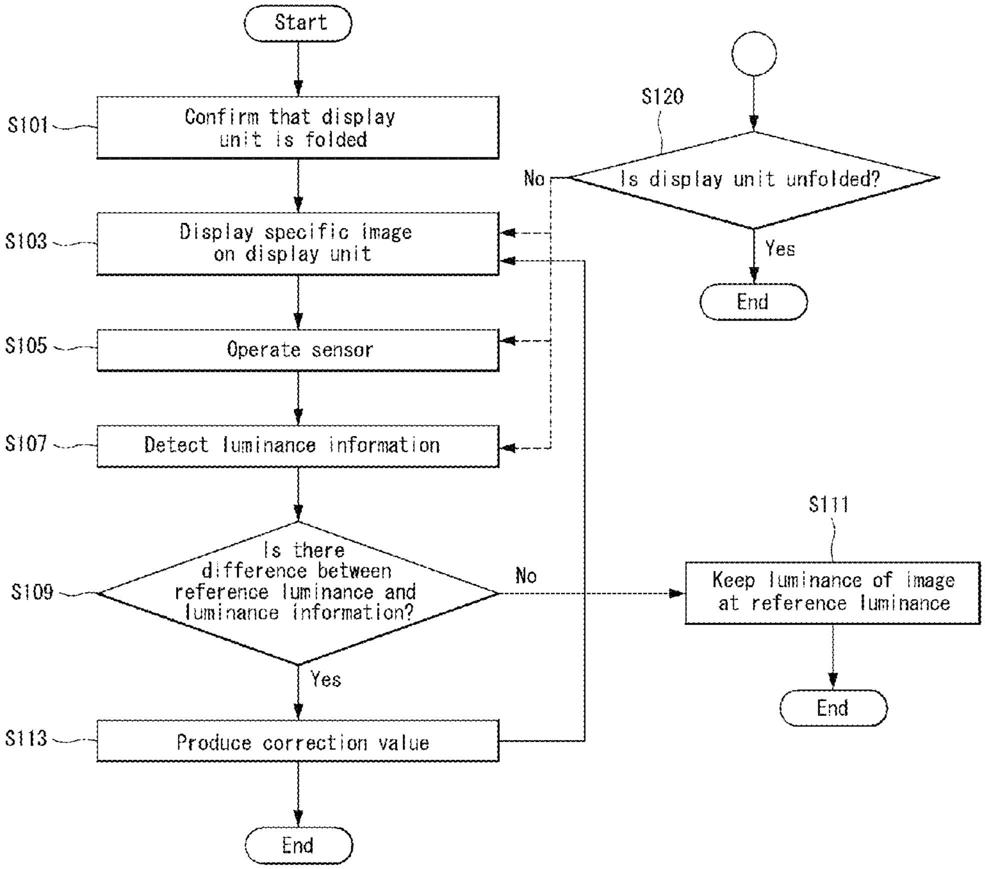
FIG. 7 is a flow chart illustrating an exemplary correction operation of a flat panel display according to the present invention.

FIG. 7 is a flow chart illustrating an exemplary correction operation of a flat panel display according to the present invention;

As shown in FIG. 7, the flat panel display confirms that the display unit 110 is folded toward the input unit 130 in step S101. More specifically, the sensor 140 formed in the input unit 130 or a separate device may confirm that the display unit 110 is folded toward the input unit 130. When the sensor 140 confirms that the display unit 110 is folded toward the input unit 130, the sensor 140 may transfer information corresponding to black to the optical correction unit 160. In other words, the optical correction unit 160 may control the sensor 140 so as to detect whether or not the display unit 110 is folded toward the input unit 130.

Next, when the display unit 110 is folded toward the input unit 130, the display unit 110 displays a specific image in step S103 so that the sensor 140 detects that the display unit 110 is folded toward the input unit 130. The specific image may be displayed in a predetermined area in a rectangle or circle shape or may be displayed entirely on the display screen of the display unit 110 as described above. The driver 120 receives a signal from the optical correction unit 160 and drives in response to the signal, and thus the display unit 110 may display the specific image. However, the display unit 110 is not limited thereto.

Next, when the display unit 110 displays the specific image in a state where the display unit 110 is folded toward the input unit 130, the sensor 140 detects luminance information from the specific image displayed on the display unit 110 and transfers the luminance information to the optical correction unit 160 in step S105.

Next, the optical correction unit 160 receives the luminance information from the sensor 140 to detect the luminance information of the specific image displayed on the display unit 110 in step S107. When the luminance information of the specific image displayed on the display unit 110 is an analog signal, the optical correction unit 160 may convert the analog signal into a digital signal.

Next, the optical correction unit 160 compares the luminance information with a reference luminance set inside the optical correction unit 160 in step S109. The reference luminance may correspond to a luminance that was set before the flat panel display is put on the market, but may vary depending on the user.

Next, if there is a difference between the reference luminance and the luminance information, the optical correction unit 160 produces a correction value corresponding to the difference in step S113. More specifically, the optical correction unit 160 may perform a correction operation to produce the correction value until the difference between the reference luminance and the luminance information falls within a predetermined error range. In this case, the optical correction unit 160 may repeatedly perform the processes ranging from the step S103, in which the display unit 110 displays the specific image based on the correction value, to the step S113 in which the correction value is produced. The correction value obtained through the processes is stored in the memory 170.

Further, if there is no difference between the reference luminance and the luminance information in step S109, the optical correction unit 160 keeps a luminance of the image displayed on the display unit 110 at the reference luminance in step S111.

Every time the flat panel display is turned on, the display unit 110 may display a corrected image to which the correction value stored in the memory 170 is applied. The optical correction unit 160 may control the sensor 140 so that the sensor 140 detects the luminance information of the image displayed on the display unit 110 during a turn-on or turn-off period of the display unit 110 in a state where the display unit 110 is folded. However, if the display unit 110 is unfolded, the optical correction unit 160 may stop a process for correcting a luminance of the display unit 110 in step S120. The optical correction unit 160 may set an unfolded state of the display unit 110 as a global interrupt and may perform the setting process of the global interrupt earlier than the correction process. Accordingly, the optical correction unit 160 may be set so that when the user uses the flat panel display, the user is not inconvenienced from the correction operation of the flat panel display.

Because the optical correction unit 160 may have a pattern generating function, the optical correction unit 160 may control the driver 120 so that the display unit 110 displays the specific image, if desired. Optical correction methods depending on flat panel displays are described below.

Figure 8:
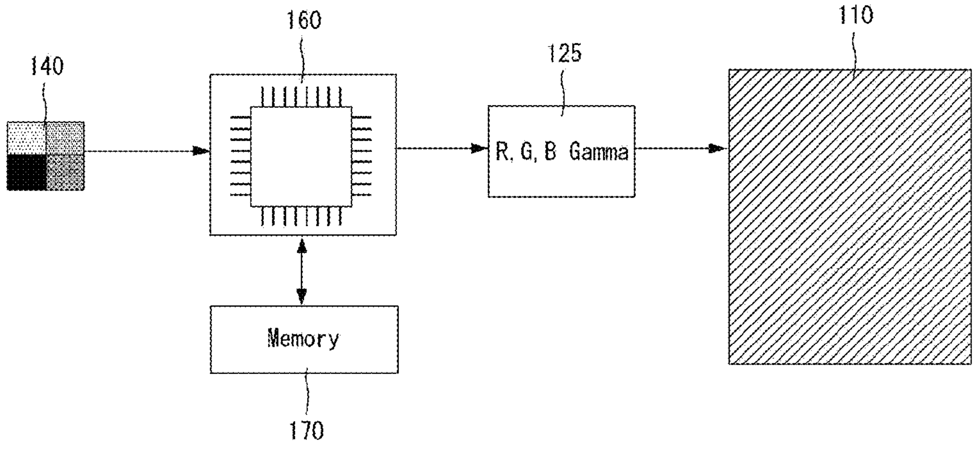
FIG. 8 is a block diagram illustrating an exemplary optical correction method of an organic light emitting diode display panel.
Figure 9:
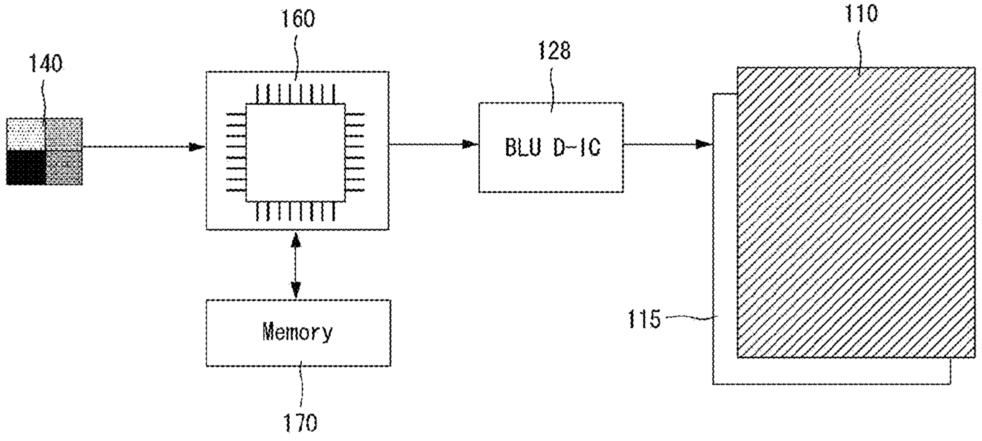
FIG. 9 is a block diagram illustrating an exemplary optical correction method of a liquid crystal display panel.

FIG. 8 is a block diagram illustrating an exemplary optical correction method of an organic light emitting diode display panel. FIG. 9 is a block diagram illustrating an exemplary optical correction method of a liquid crystal display panel.

As shown in FIGS. 8 and 9, the optical correction unit 160 produces the correction value through the sensor 140, and the produced correction value is stored in the memory 170. The optical correction unit 160 provides the correction value stored in the memory 170 to a gamma unit 125 so that the display unit 110 displays a corrected image to which the correction value is applied.

Figure 10:
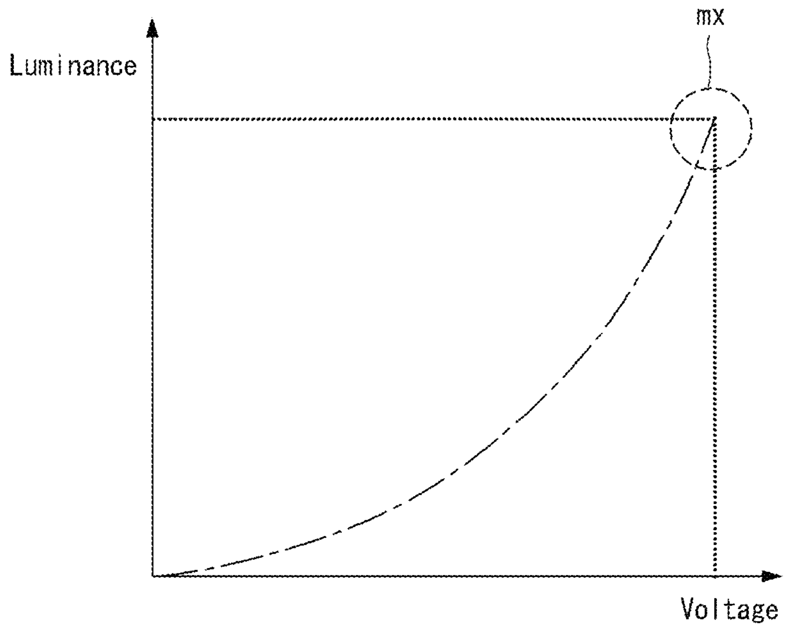
FIG. 10 is a graph illustrating a gamma curve of an organic light emitting diode display.

When the display unit 110 is the OLED display panel, the optical correction unit 160, as shown in FIG. 8, may control the gamma unit 125 so as to correct voltages of gammas. FIG. 10 is a graph illustrating a gamma curve of an organic light emitting diode display. As shown in FIG. 10, the gamma unit 125 may correct maximum voltages mx of red, green, blue gammas under the control of the optical correction unit 160.

When the display unit 110 is the LCD panel, the optical correction unit 160, as shown in FIG. 9, may control the driver 128 so as to correct voltages of gammas. As shown in FIG. 9, the optical correction unit 160 may control a driver 128 of a backlight unit 115 so that a brightness of the backlight unit 115 is corrected.

As described above, the embodiments of the invention provide a flat panel display having a self-correction function capable of keeping an initial display quality of the flat panel display when the flat panel display is put on the market at a level equal to or greater than a half lifetime. Reduction in a luminance of a flat panel display panel or changes in a color coordinate of the flat panel display can be prevented. Furthermore, the embodiments of the present invention can solve the problem of a color coordinate movement of an OLED display causing a degradation phenomenon in each of red, green, and blue subpixels.

It will be apparent to those skilled in the art that various modifications and variations can be made in the flat panel display and method for driving the flat panel display of the present invention without departing from the spirit or scope of the invention. Thus, it is intended that the present invention cover the modifications and variations of this invention provided they come within the scope of the appended claims and their equivalents.

What is claimed is:

1. A flat panel display comprising:

a display unit, the display unit displaying a first image;

an input unit, the input unit being positioned adjacent to the display unit when the display unit is folded toward the input unit;

at least one sensor, the sensor detecting luminance information of a second image displayed on the display unit when the display unit is folded toward the input unit and detecting when the display unit is folded toward the input unit; and an optical correction unit, the optical correction unit receiving the luminance information from the sensor and correcting a luminance of the display unit using the luminance information, wherein the second image is a predetermined test pattern and is displayed in a portion of the display unit corresponding to a location of the sensor, wherein when the at least one sensor detects that the display unit is folded toward the input unit, the at least one sensor transfers information corresponding to black to the optical correction unit.

2. The flat panel display according to claim 1 wherein the second image is displayed in either a predetermined area of the display unit or on the entire display unit.

3. The flat panel display according to claim 1 wherein the optical correction unit compares the luminance information with reference luminance information and performs a correction operation if the luminance information is not within a predetermined range of the reference luminance information.

4. The flat panel display according to claim 3 wherein the display unit displays a corrected first image after the correction operation is performed and the display unit is unfolded from the input unit.

5. The flat panel display according to claim 3 wherein the reference luminance information is either set to a predetermined value or is set by a user.

6. The flat panel display according to claim 3 wherein the optical correction unit produces a correction value corresponding to a difference between the luminance information and the reference luminance information.

7. The flat panel display according to claim 3 wherein if the luminance value is within the predetermined range of the reference luminance information, the correction operation is not performed.

8. The flat panel display according to claim 1 wherein the displaying of the second image and detection of luminance information are terminated when the display unit is unfolded from the input unit.

9. The flat panel display according to claim 1 wherein the sensor is detachably connected to the input unit.

10. The flat panel display according to claim 1 wherein if the display unit is an organic light emitting diode display panel, the optical correction unit corrects maximum voltages of red, green, and blue gammas.

11. The flat panel display according to claim 1 wherein if the display unit is a liquid crystal display device, the optical unit corrects a brightness of a backlight unit or voltages of gamma.

12. A method for operating a display unit, comprising the steps of:

displaying a first image when the display unit is not folded toward an input unit confirming that the display unit is folded toward the input unit;

displaying a second image on the display unit when the display unit is folded toward the input unit;

detecting luminance information of the second image, wherein the detecting the luminance information is performed by at least one sensor;

transferring the luminance information of the second image to an optical correction unit;

comparing the luminance information with reference luminance information; and performing a correction operation if the luminance information is not within a predetermined range of the reference luminance information, wherein the second image is a predetermined test pattern and is displayed in a portion of the display unit corresponding to a location of a sensor detecting luminance information of the second image;

wherein the confirming that the display unit is folded toward the input unit is performed by the at least one sensor and includes sensing, by the at least one sensor, whether the display unit is folded toward the input unit, and when the sensing confirms that the display unit is folded toward the input unit, transferring information corresponding to black to the optical correction unit.

13. The method for operating a display unit according to claim 12 wherein during the step of displaying the second image, the second image is displayed in either a predetermined area of the display unit or on the entire display unit.

14. The method for operating a display unit according to claim 12 wherein the reference luminance information is either set to a predetermined value or is set by a user.

15. The method for operating a display unit according to claim 12, further comprising the step of producing a correction value corresponding to a difference between the luminance information and the reference luminance information.

16. The method for operating a display unit according to claim 12 wherein if the luminance value is within the predetermined range of the reference luminance information, the correction operation is not performed.

17. The method for operating a display unit according to claim 12 wherein the steps of displaying a second image and detecting luminance information of the second image are terminated when the display unit is unfolded from the input unit.

18. The method for operating a display unit according to claim 12, further comprising the step of displaying a corrected first image after the correction operation is performed and the display unit is unfolded from the input unit.

19. The method for operating a display unit according to claim 12 further comprising the step of correcting maximum voltages of red, green, and blue gammas when the display unit is an organic light emitting diode display panel.

20. The method for operating a display unit according to claim 12 further comprising the step of correcting a brightness of a backlight unit or voltages of gamma when the display unit is a liquid crystal display device.

* * * * *